US 12,304,077 B2

United States Patent
Fujimoto et al.

(10) Patent No.: US 12,304,077 B2
(45) Date of Patent: May 20, 2025

(54) MODELING OF CONTROLLED OBJECT

(71) Applicants: The University of Tokyo, Tokyo (JP); KABUSHIKI KAISHA YASKAWA DENKI, Kitakyushu (JP)

(72) Inventors: Hiroshi Fujimoto, Tokyo (JP); Ryohei Kitayoshi, Fukuoka (JP)

(*) Notice: Subject to any disclaimer, the term of this patent is extended or adjusted under 35 U.S.C. 154(b) by 284 days.

(21) Appl. No.: 18/192,646

(22) Filed: Mar. 30, 2023

(65) Prior Publication Data
US 2023/0234223 A1    Jul. 27, 2023

Related U.S. Application Data

(63) Continuation of application No. PCT/JP2020/037868, filed on Oct. 6, 2020.

(51) Int. Cl.
*B25J 9/16* (2006.01)
*B25J 13/08* (2006.01)
*G05B 13/04* (2006.01)

(52) U.S. Cl.
CPC ........... *B25J 9/163* (2013.01); *B25J 9/1633* (2013.01); *B25J 9/1671* (2013.01); *B25J 13/089* (2013.01)

(58) Field of Classification Search
CPC ........ B25J 9/163; B25J 9/1633; B25J 9/1671; B25J 13/089; G05B 2219/39332; G05B 13/04

(Continued)

(56) References Cited

U.S. PATENT DOCUMENTS 5,153,923 A * 10/1992 Matsuba .............. G06N 3/04
  382/158
5,268,834 A * 12/1993 Sanner ................ G05B 13/027
  706/23

(Continued)

FOREIGN PATENT DOCUMENTS

JP    H5-143108    6/1993
JP    2003-295906    10/2003

(Continued)

OTHER PUBLICATIONS

Office Action issued in Japanese Patent Application No. P2022-555003, dated Jun. 18, 2024 (with English partial translation).

(Continued)

*Primary Examiner* — Jaime Figueroa
(74) *Attorney, Agent, or Firm* — SOEI PATENT & LAW FIRM

(57) ABSTRACT

A control system includes circuitry configured to: generate, based on a command profile representing a temporal change of a command for driving a controlled object and a response profile representing a temporal change of a state of the controlled object responding to the command profile, a first model representing at least a part of a relation between the command and the state of the controlled object; generate, based on the command profile, the response profile, and the first model, a second model representing another part of the relation that is not represented by the first model; generate, based on the first model and the second model, one or more control parameters representing a relation between a control reference and the command for causing the controlled object to follow the control reference; and control the controlled object to cause the state of the controlled object to follow the control reference based at least in part on the control reference and the one or more control parameters.

20 Claims, 6 Drawing Sheets

(58) Field of Classification Search
USPC .............. 700/245–264; 318/568.11–568.25
See application file for complete search history.

(56) References Cited

U.S. PATENT DOCUMENTS

| | | | | |
|---|---|---|---|---|
| 5,459,659 | A * | 10/1995 | Takenaka | B62D 57/032 901/33 |
| 5,598,076 | A * | 1/1997 | Neubauer | G05B 13/027 318/568.22 |
| 5,627,768 | A * | 5/1997 | Uhlmann | G06F 17/18 702/109 |
| 7,085,688 | B1 | 8/2006 | Sumida et al. | |
| 8,452,448 | B2 * | 5/2013 | Pack | G06N 3/008 700/250 |
| 9,440,353 | B1 * | 9/2016 | da Silva | B25J 9/1633 |
| 9,545,995 | B1 * | 1/2017 | Chau | G05B 13/04 |
| 10,773,382 | B2 * | 9/2020 | Bai | B25J 9/1697 |
| 10,792,810 | B1 | 10/2020 | Beckman | B25J 9/163 |
| 11,045,948 | B2 * | 6/2021 | Diankov | B25J 9/1666 |
| 11,065,762 | B2 * | 7/2021 | Sakai | G05B 19/4182 |
| 11,213,953 | B2 * | 1/2022 | Lee | B25J 9/1697 |
| 11,461,589 | B1 * | 10/2022 | Bai | G06N 3/08 |
| 11,498,220 | B2 * | 11/2022 | Okura | B25J 9/1697 |
| 11,607,808 | B2 * | 3/2023 | Rottmann | B25J 9/1664 |
| 2004/0102891 | A1 | 5/2004 | Ehara | |
| 2007/0234781 | A1 | 10/2007 | Yamada et al. | |
| 2009/0254217 | A1 * | 10/2009 | Pack | G06N 3/008 700/246 |
| 2014/0052298 | A1 * | 2/2014 | Hourtash | B25J 9/1689 700/263 |
| 2017/0015405 | A1 * | 1/2017 | Chau | G05B 13/04 |
| 2018/0236657 | A1 | 8/2018 | Kuwahara et al. | |
| 2019/0084151 | A1 * | 3/2019 | Bai | B25J 9/1697 |
| 2019/0270200 | A1 * | 9/2019 | Sakai | B25J 9/163 |
| 2019/0344441 | A1 * | 11/2019 | Rottmann | B25J 9/1633 |
| 2019/0344444 | A1 * | 11/2019 | Morra | B25J 9/1692 |
| 2020/0070343 | A1 * | 3/2020 | Thomaz | B25J 9/163 |
| 2020/0086483 | A1 * | 3/2020 | Li | B25J 9/1653 |
| 2020/0171656 | A1 * | 6/2020 | Diankov | B25J 9/163 |
| 2020/0333775 | A1 * | 10/2020 | Matsumoto | G05B 19/4069 |
| 2020/0398435 | A1 * | 12/2020 | Okura | B25J 9/1671 |
| 2021/0023711 | A1 * | 1/2021 | Lee | B25J 9/1689 |

FOREIGN PATENT DOCUMENTS

| | | |
|---|---|---|
| JP | 2004-178247 | 6/2004 |
| JP | 2007-109103 | 4/2007 |
| JP | 2007-149124 | 6/2007 |
| JP | 2007-264796 | 10/2007 |
| JP | 2018-134703 | 8/2018 |
| JP | 2020-030575 | 2/2020 |
| WO | 2019/159883 | 8/2019 |
| WO | WO-2019159883 A1 * | 8/2019 |

OTHER PUBLICATIONS

International Preliminary Report on Patentability with Written Opinion dated Apr. 20, 2023 for PCT/JP2020/037868.
International Search Report dated Dec. 28, 2020 for PCT/JP2020/037868.

* cited by examiner

MODELING OF CONTROLLED OBJECT

CROSS-REFERENCE TO RELATED APPLICATIONS

This application is a continuation application of PCT Application No. PCT/JP2020/037868, filed on Oct. 6, 2020. The entire contents of the above listed PCT application are incorporated herein by reference.

BACKGROUND

Field

The present disclosure relates to a control system, a method, and a memory device.

Description of the Related Art

Japanese Unexamined Patent Publication No. 2018-134703 discloses a robot simulator including a model storage unit that is configured to store model information related to a robot and an obstacle, and an information processing unit that is configured to generate a path capable of moving a distal end portion of the robot from a start position to an end position based on the model information while avoiding a collision between the robot and the obstacle.

SUMMARY

Disclosed herein is a control system. The control system may include circuitry configured to: generate, based on a command profile representing a temporal change of a command for driving a controlled object and a response profile representing a temporal change of a state of the controlled object responding to the command profile, a first model representing at least a part of a relation between the command and the state of the controlled object; generate, based on the command profile, the response profile, and the first model, a second model representing another part of the relation that is not represented by the first model; generate, based on the first model and the second model, one or more control parameters representing a relation between a control reference and the command for causing the controlled object to follow the control reference; and control the controlled object to cause the state of the controlled object to follow the control reference based at least in part on the control reference and the one or more control parameters.

Additionally, a method is disclosed herein. The method may include: generating, based on a command profile representing a temporal change of a command for a controlled object and a response profile representing a temporal change of a state of the controlled object responding to the command profile, a first model representing at least a part of a relation between the command and the state of the controlled object; generating, based on the command profile, the response profile, and the first model, a second model representing another part of the relation that is not represented by the first model; generating, based on the first model and the second model, one or more control parameters representing a relation between a control reference and the command for causing the controlled object to follow the control reference; and transmitting the one or more control parameters for controlling the controlled object to cause the state of the controlled object to follow the control reference based at least in part on the control reference and the one or more control parameters.

Additionally, a non-transitory memory device is disclosed herein. The memory device may have instructions stored thereon that, in response to execution by a processing device, cause the processing device to perform operations comprising: generating, based on a command profile representing a temporal change of a command for a controlled object and a response profile representing a temporal change of a state of the controlled object responding to the command profile, a first model representing at least a part of a relation between the command and the state of the controlled object; generating, based on the command profile, the response profile, and the first model, a second model representing another part of the relation that is not represented by the first model; generating, based on the first model and the second model, one or more control parameters representing a relation between a control reference and the command for causing the controlled object to follow the control reference; and transmitting the one or more control parameters for controlling the controlled object to cause the state of the controlled object to follow the control reference based at least in part on the control reference and the one or more control parameters.

DETAILED DESCRIPTION

In the following description, with reference to the drawings, the same reference numbers are assigned to the same components or to similar components having the same function, and overlapping description is omitted.

Control System

Figure 1:
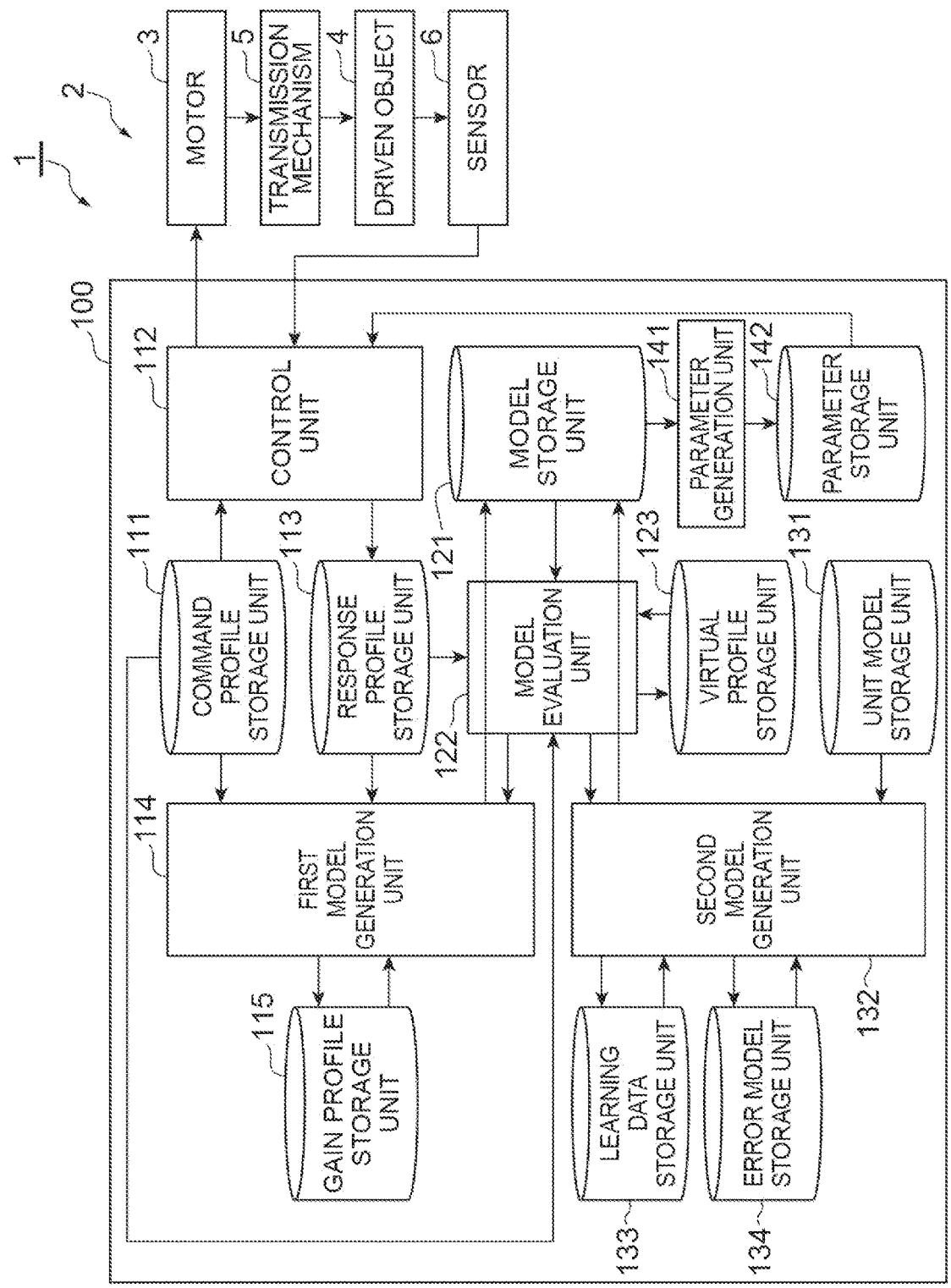
FIG. 1 is a schematic diagram illustrating an example configuration of a control system.

As illustrated in FIG. 1, a control system 1 includes a controlled object 2 and a control device 100 that controls the controlled object 2. The controlled object 2 includes a motor 3, a transmission mechanism 5, a driven object 4, and a sensor 6. The shape, structure, and size of the driven object 4 in the controlled object 2, and the number and size of the motor 3 may vary according to the examples described herein. FIG. 1 illustrates an example case where there is one motor 3 and the driven object 4 is one rigid body.

The motor 3 generates power for driving the driven object 4 in response to supply of electric power. The motor 3 may be a rotary motor that rotationally drives the driven object 4 or may be a linear motor that displaces the driven object 4 along a straight line. The motor 3 may be a synchronous motor or may be an induction motor. The motor 3 may be a permanent magnet-type synchronous motor such as a surface permanent magnet (SPM) motor or an interior permanent magnet (IPM) motor, or may be a synchronous motor having no permanent magnets such as a synchronous reluctance motor.

The transmission mechanism 5 transmits the speed of the output axle of the motor 3 to the driven object 4. The transmission mechanism 5 is, for example, a speed reducer configured such that the speed of the driven object 4 is lower than the speed of the output axle of the motor 3. For example, the transmission mechanism 5 includes a plurality of gears that transmit power from the motor 3 to the driven object 4 at a predetermined reduction ratio.

The sensor 6 detects a response value of the controlled object 2 corresponding to the command. Examples of the response value include position and speed of the driven object 4. If the motor 3 is a rotary type, the rotation angle of the driven object 4 by the motor 3 corresponds to "position", and the rotation speed of the driven object 4 by the motor 3 corresponds to "speed". The torque corresponds to the driving force. Examples of the sensor 6 include a rotary encoder that outputs a pulse signal having a frequency proportional to the operation speed of the driven object 4. The rotary encoder can acquire both position and speed of the driven object 4.

The control device 100 controls the motor 3 to cause the driven object 4 to perform a desired action. The control device 100 controls the motor 3 based on one or more pre-generated control parameters. The one or more control parameters define a relationship between an operation command (a control reference) for the controlled object 2 and at least a part of a control amount (a control command) to cause the controlled object 2 to follow the motion command. Examples of the control reference include a position command and a speed command for the driven object 4. Examples of the control command include a driving force command for the motor 3.

Examples of the one or more control parameters include a proportional gain, an integral gain, and a differential gain in so-called feedback control. As another example of the one or more control parameters, a parameter for feedforward compensation that compensates for a response delay in feedback control may be used.

These control parameters can be generated based on a model of the controlled object 2. The model of the controlled object 2 represents at least a part of response characteristics of the controlled object 2 with respect to the control command. The control device 100 may be configured to generate the model of the controlled object 2 and to generate control parameters based on the model.

Generating the model and control parameters corresponds to producing at least a part of the control device 100. Therefore, it can be said that the control device 100 having a function of generating the model and the one or more control parameters includes a production device of the control device 100 itself (production device of the control system 1). The production device may not be included in the control device 100, and may be included in another device capable of communicating with the control device 100. Examples of the other device include a host controller (for example, a programmable logic controller) capable of communicating with the control device 100, a personal computer, and a portable terminal.

Here, in order to generate accurate control parameters, an accurate model should be generated. Examples of the model include a linear model represented by a linear differential equation. However, the actual controlled object 2 includes components that are difficult to model with a linear model. Examples of components that are difficult to model include rattling due to backlash of the transmission mechanism 5, Coulomb friction occurring inside the controlled object 2, quantization error in digital signal processes, and the like.

The control device 100 generates a model including components difficult to be modeled with the linear model, and generates control parameters based on the generated model.

For example, the control device 100 may be configured to perform: generating, based on a command profile representing a temporal change of a command for the controlled object 2 and a response profile representing a temporal change of a state of the controlled object 2 corresponding to the command profile, a first model representing at least a part of response characteristics of the controlled object 2 (a part of a relation between the command and the state of the controlled object); generating, based on the command profile, the response profile, and the first model, a second model representing characteristics that are not included in the first model among response characteristics (another part of the relation that is not represented by the first model); and generating one or more control parameters based on the first model and the second model.

Examples of the control command include, but are not limited to, a command of a driving force generated in the motor 3 (Hereinafter referred to as "driving force command")). The command may be a command of speed of the motor 3 or a command of position of the motor 3.

Examples of the response include, but are not limited to, the speed of the driven object 4, the position of the driven object 4, and the like. The response may be a driving force transmitted from the motor 3 to the driven object 4 or a driving current supplied to the motor 3 to transmit the driving force. Hereinafter, an example case in which the command is the driving force command and the response is speed or position of the driven object 4 will be described in detail.

For example, the control device 100 includes a command profile storage unit 111, a control unit 112, a response profile storage unit 113, a first model generation unit 114, a gain profile storage unit 115, a second model generation unit 132, a model storage unit 121, a parameter generation unit 141, and a parameter storage unit 142 as functional components (hereinafter referred to as "functional block").

The command profile storage unit 111 is configured to store the command profile. The command profile may include an oscillation that repeatedly increases and decreases over time. Examples of the command profile include various signals such as a chirp signal, a multi-sine signal, a pseudo-random signal, a random signal, a short-time irregular signal, and an impulse excitation signal. The command profile storage unit 111 may store a command profile that is continuously represented as a function or may store a command profile that is discretely represented as a time-series command value group (for example, a table).

The control unit 112 is configured to cause the state of the controlled object 2 to follow the control reference based at least in part on the control reference and the one or more control parameters. For example, the control unit 112 is configured to drive the motor 3. For example, the control unit 112 repeatedly generates driving electric power based on a command profile stored in the command profile storage unit 111 and supplies the driving electric power to the motor 3 in a predetermined control cycle.

When driving the motor 3, the control unit 112 acquires a response profile representing a temporal change in the state of the controlled object 2 (for example, speed or position of the driven object 4) corresponding to the command profile, and stores the response profile in the response profile storage unit 113. For example, during a period in which the control unit 112 drives the motor 3 based on the command profile, the control unit 112 acquires a detection value of the state of the driven object 4 in the sensor 6 in each control cycle, and stores the detection value in the response profile storage unit 113 in time series.

The first model generation unit 114 is configured to generate the first model based on the command profile stored in the command profile storage unit 111 and the response profile stored in the response profile storage unit 113 in correspondence with the command profile. For example, the first model generation unit 114 generates a gain profile representing a relationship between the frequency of the command and the response gain of the controlled object 2 with respect to the command based on the command profile and the response profile, and stores the gain profile in the gain profile storage unit 115. For example, the first model generation unit 114 generates the gain profile by a frequency analysis method such as fast Fourier transform (FFT). The response gain is a value representing a relationship between the amplitude of the response profile and the amplitude of the command profile, and is, for example, a magnification of the amplitude of the response profile with respect to the amplitude of the command profile.

The first model generation unit 114 is configured to generate the first model based on a linear model having frequency characteristics fitted to a gain profile. The linear model is a model in which a relationship between an input function representing a relationship between elapsed time and an input and an output function representing a relationship between elapsed time and an output is represented by a linear differential equation. Fitting does not mean perfect matching, but means approximation. Examples of the fitting method include a least square method, polynomial approximation, circular approximation, approximation by various functions (trigonometric function, B-Spline, and the like), and the like.

The first model generation unit 114 may generate the first model based on a learned model generated by machine learning so as to represent a relationship between the gain profile and the linear model. The first model generation unit 114 stores the generated first model in the model storage unit 121.

The second model generation unit 132 is configured to generate the second model based on the command profile, the response profile, and the first model. The second model generation unit 132 may generate the second model based on a plurality of types of elemental models prepared in advance. For example, the control device 100 further includes an elemental model storage unit 131 configured to store the plurality of types of elemental models, and the second model generation unit 132 generates the second model based on the plurality of types of elemental models stored in the elemental model storage unit 131.

At least one of the plurality of types of elemental models may be a non-linear model representing non-linear characteristics with respect to the command. Examples of the elemental model include a model representing a relationship between the speed of the motor 3 and the Coulomb friction acting on the motor 3. Since the Coulomb friction also changes from a negative value to a positive value in a stepwise manner in response to switching of the speed from a negative value to a positive value, the relationship between the speed and the Coulomb friction becomes nonlinear.

Another example of the elemental model is a model representing a relationship between the difference between the position of the motor 3 and the position of the driven object 4 and the magnitude of the torque transmitted from the motor 3 to the driven object 4. The difference between the position of the motor 3 and the position of the driven object 4 is caused by the backlash of the transmission mechanism 5 described above or the like. Since the torque transmitted from the motor 3 to the driven object 4 changes stepwise between a state where the gears are not engaged with each other due to the presence of backlash and a state where the gears are engaged with each other, the relationship between the difference between the position of the motor 3 and the position of the driven object 4 and the torque transmitted from the motor 3 to the driven object 4 becomes nonlinear. Another example of a elemental model is a model representing the quantization error when the state of the controlled object 2 is digitized by the sensor 6. The second model generation unit 132 stores the generated second model in the model storage unit 121.

The second model generation unit 132 may generate the second model by provisionally generating the second model based on the weighted sum of the plurality of types of elemental models and repeatedly modifying the weights of the plurality of types of elemental models in the second model based on an evaluation result of a modeling error between the first model and the second model until a predetermined condition is satisfied.

For example, the control device 100 further includes a model evaluation unit 122 and a virtual profile storage unit 123. The model evaluation unit 122 is configured to generate, based on the command profile stored in the command profile storage unit 111 and the first model and the second model stored in the model storage unit 121, a virtual response profile obtained by simulating a temporal change in the state of the controlled object 2 corresponding to the command profile, and store the virtual response profile in the virtual profile storage unit 123.

The model evaluation unit 122 evaluates an error of the virtual response profile with respect to the response profile based on the response profile stored in the response profile storage unit 113 and the virtual response profile stored in the virtual profile storage unit 123. The error of the virtual response profile with respect to the response profile is an example of the modeling error.

As long as the model evaluation unit 122 can output a numerical value representing the evaluation result of the error, there is no particular limitation on the calculation method for evaluation of the error. For example, the model evaluation unit 122 may output a value obtained by time-integrating the absolute values of errors as the evaluation result, or may output a time-average value of the absolute values of errors as the evaluation result. The model evaluation unit 122 may output a value obtained by time-integrating the square of the error as the evaluation result, may output a time-average value of the square of the error as the evaluation result, or may output a square root of the time-average value as the evaluation result. The model evaluation unit 122 may output an evaluation result of the error every time the stored content in the model storage unit 121 is updated.

The second model generation unit 132 provisionally generates the second model based on the weighted sum of a plurality of types of elemental models, and stores the second model in the model storage unit 121. Thus, when the storage contents of the model storage unit 121 are updated, the model evaluation unit 122 evaluates the error. The second model generation unit 132 repeats modifying the weights of the plurality of types of elemental models in the second model based on the evaluation result of the error evaluated by the model evaluation unit 122 and storing the modified second model in the model storage unit 121 until the predetermined condition is satisfied. At the timing when the predetermined condition is satisfied, the second model stored in the model storage unit 121 becomes the generation result of the second model by the second model generation unit 132.

An example of the predetermined condition is that an evaluation result of error is equal to or less than a predetermined level. (hereinafter referred to as "second level"). The second model generation unit 132 may store the second model satisfying the predetermined condition in the model storage unit 121 as the final generation result. The predetermined condition may be that the number of modification in the weight of a plurality of types of elemental models in the second model is a predetermined number. The second model generation unit 132 may store, in the model storage unit 121, the second model having the smallest evaluation result of error among the second models generated until the predetermined condition is satisfied as the final generation result.

The second model generation unit 132 may generate the second model by repeating, until a predetermined condition is satisfied, generating an error model representing the relationship between the weights of a plurality of types of elemental models in the second model and the evaluation result of the error based on the provisionally generated second model and the evaluation result of the error based on the provisionally generated second model, and changing the weight based on a predetermined target error and the error model, and updating the error model based on the second model after the weight is modified and an evaluation result of the error based on the second model after the weight is modified. Examples of the error model include a statistical model based on Bayesian estimation. The predetermined target error is less than or equal to the second level.

For example, the control device 100 further includes a learning data storage unit 133 and an error model storage unit 134. The second model generation unit 132 is configured to store, in the learning data storage unit 133, a record in which the provisionally generated second model is associated with the evaluation result of the error based on the provisionally generated second model. The second model generation unit 132 generates an initial error model based on the record stored in the learning data storage unit 133, and stores the generated initial error model in the error model storage unit 134. The second model generation unit 132 may randomly modify the weight and store the record corresponding to the second model after the weight is modified in the learning data storage unit 133 one or more times, thereby generating an initial error model based on the plurality of records accumulated in the learning data storage unit 133.

After generating the initial error model, the second model generation unit 132 repeats the following procedures until a predetermined condition is satisfied.
  i) Modifying the weight based on the target error and the error model, and storing the second model after the modification of the weight in the model storage unit 121.
  ii) Accumulating a record in which the second model after the modification of the weight is associated with the evaluation result of error based on the second model after the modification in weight in the learning data storage unit 133.
  iii) Updating the error model in the error model storage unit 134 based on records accumulated in the learning data storage unit 133.

The first model generation unit 114 may regenerate the first model based on the command profile, the response profile, and the second model if the evaluation result of the error evaluated by the model evaluation unit 122 after the second model is generated exceeds a predetermined level. Here, the predetermined level (hereinafter referred to as a "first level") may be a value lower than the second level. (The second level may be a higher value than the first level.)

For example, when the evaluation result of the error after the second model is generated exceeds the first level, the first model generation unit 114 may modify the gain profile based on the command profile, the response profile, and the second model, and may regenerate the first model by fitting the frequency characteristics of the linear model to the modified gain profile.

For example, the first model generation unit 114 may generate a modified profile by removing the response of the second model from the response profile based on the command profile, the response profile, and the second model, and may modify the gain profile based on the command profile and the modified profile.

The second model generation unit 132 may regenerate the second model based on the command profile, the response profile, and the first model if the evaluation result of the error after the first model is regenerated exceeds a predetermined level (for example, the first level). If the first model is regenerated, the second model generation unit 132 may regenerate the second model regardless of a necessity of the regeneration of the second model.

As described above, with the method of regenerating the first model after the second model is generated and regenerating the second model after the first model is regenerated, the generation result of the first model and the generation result of the second model influence each other, and the modeling accuracy of the controlled object 2 may be further improved.

Based on the first model and the second model stored in the model storage unit 121, the parameter generation unit 141 is configured to generate one or more control parameters that define a relationship between the control reference and the control command for causing the controlled object 2 to follow the control reference. As an example, the parameter generation unit 141 generates the one or more control parameters that define a relationship between the control reference and a feed-forward compensation value for causing the controlled object 2 to follow the control reference. Examples of the feed-forward compensation value include a compensation value added to the control command by the feedback control so as to reduce a control error by the feedback control. (For example, the error between the command reference and the response of the controlled object 2 to the command value.) The parameter generation unit 141 stores the generated control parameters in the parameter storage unit 142.

After the control parameters are generated, the control unit 112 controls the motor 3 based on the control parameters. For example, when the position of the motor 3 is controlled, the control unit 112 acquires current position and current speed information of the driven object 4 based on a detection value of the sensor 6, and generates driving electric power so that the current position and the current speed follow a target position and a target speed. For example, the control unit 112 may calculate, by performing a proportional operation, a proportional-integral operation, or a proportional-integral-derivative operation on an error between the target position and the current position (hereinafter referred to as "position error"), a target speed for reducing the position error. The control unit 112 calculates, by performing a proportional operation, a proportional-integral operation, or a proportional-integral-derivative operation on an error between the target speed and the current speed (hereinafter referred to as "speed error"), a driving force command for reducing the speed error.

Further, the control unit 112 calculates the feed-forward compensation value based on at least one of the target position and the target speed and control parameters stored in the parameter storage unit 142. The control unit 112 calculates a corrected command by adding the feed-forward compensation value to the driving force command, generates driving electric power based on the corrected command, and supplies the driving electric power to the motor 3. The control unit 112 repeats the above procedure at a predetermined control cycle.

Figure 2:
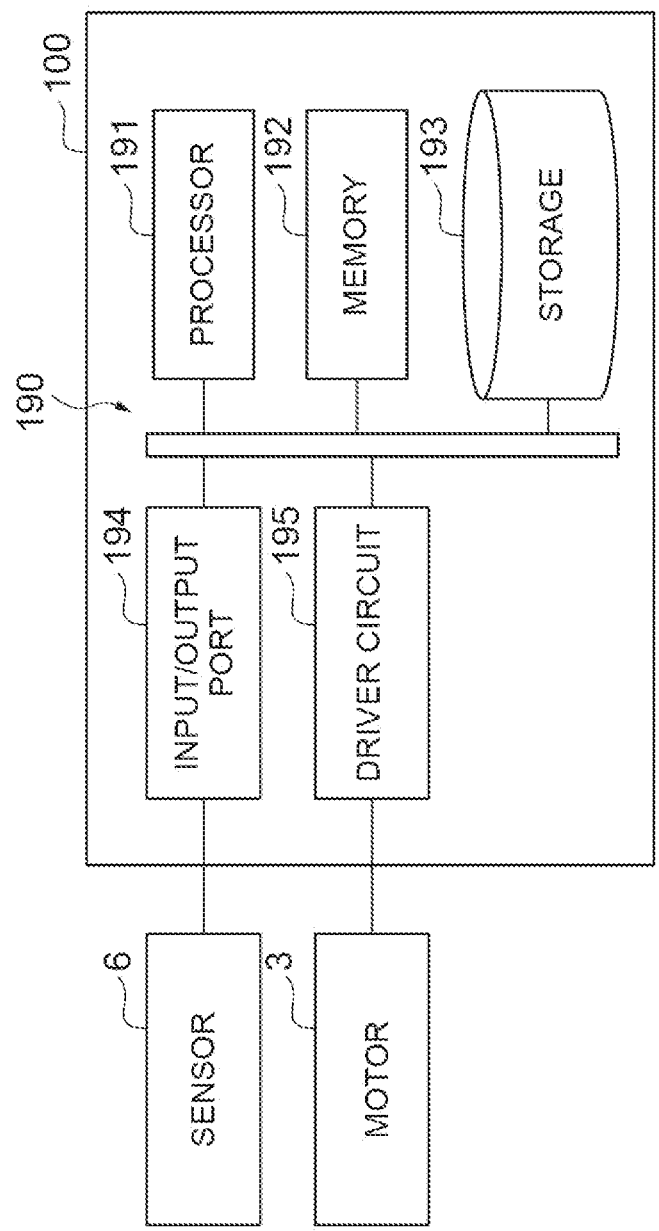
FIG. 2 is a schematic diagram illustrating an example hardware configuration of a control device.

FIG. 2 is a block diagram illustrating a hardware configuration of the control device 100. As illustrated in FIG. 2, the control device 100 includes circuitry 190. The circuitry 190 includes one or more processor(s) 191, a memory 192, storage 193, an input/output port 194, and a driver circuit 195. The storage 193 includes a computer-readable storage medium, such as a nonvolatile semiconductor memory. The storage 193 stores a program that causes the control device 100 to execute: generating the first model representing at least part of response characteristics of the controlled object 2 with respect to a command based on a command profile representing a temporal change of the command for the controlled object 2 and a response profile representing a temporal change of a state of the controlled object 2 corresponding to the command profile; generating the second model representing characteristics not included in the first model among the response characteristics based on the command profile, the response profile, and the first model; and generating one or more control parameters defining a relationship between the control reference and the control command for causing the controlled object 2 to follow the command.

The memory 192 provisionally stores the program loaded from the storage medium of the storage 193 and the calculation result by the processor(s) 191. The processor(s) 191 configures each functional block of the control device 100 by executing the program in cooperation with the memory 192. The input/output port 194 inputs and outputs electrical signals to and from the sensor 6 in accordance with commands from the processor(s) 191. The driver circuit 195 outputs driving electric power to the motor 3 in accordance with commands from the processor(s) 191.

The control device 100 may not be limited to one in which each function is configured by a program. For example, at least a part of the functions of the control device 100 may be configured by a dedicated logic circuit or an application specific integrated circuit (ASIC) in which the dedicated logic circuit is integrated.

Procedure for Generating Control Parameters

Next, as an example of the production method of the control device, an example generation procedure of one or more control parameters executed by the control device 100 will be described. This procedure includes: generating the first model representing at least a part of response characteristics of the controlled object 2 with respect to a command based on a command profile representing a temporal change of the command for the controlled object 2 and a response profile representing a temporal change of a state of the controlled object 2 corresponding to the command profile; generating the second model representing characteristics not included in the first model among the response characteristics based on the command profile, the response profile, and the first model; generating one or more control parameters for determining a relation between the control reference and the control command for causing the controlled object 2 to follow the command based on the first model and the second model. Hereinafter, a procedure of acquiring the response profile and a procedure of generating one or more control parameters based on the acquired response profile will be described in detail.

Acquisition Procedure of Response Profile

Figure 3:
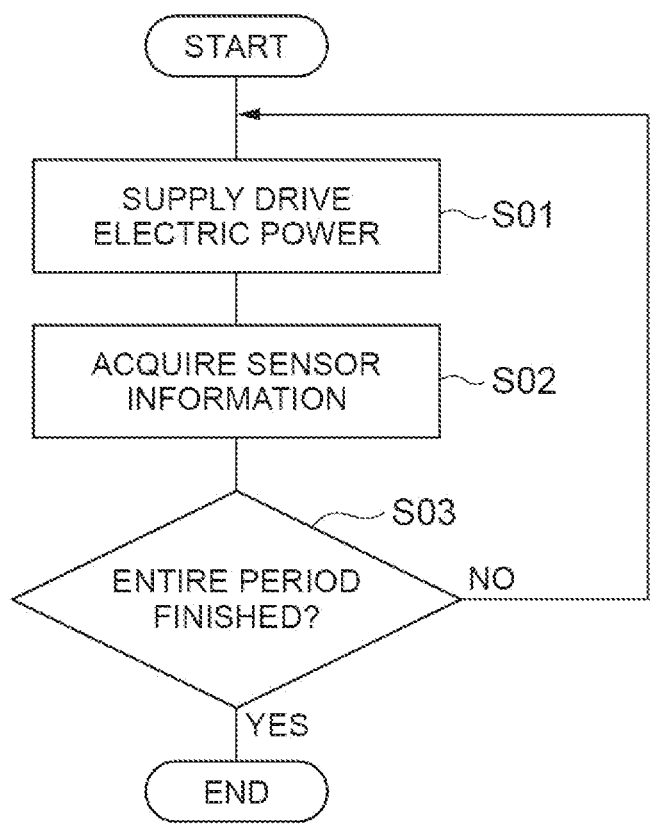
FIG. 3 is a flowchart illustrating an example control procedure of a motor.

As illustrated in FIG. 3, the control device 100 executes operations S01, 502, and S03 in order. In operation S01, the control unit 112 drives the motor 3. For example, the control unit 112 generates driving electric power based on the command profile stored in the command profile storage unit 111 and supplies the driving electric power to the motor 3. In operation S02, the control unit 112 acquires the detection value of the state of the driven object 4 by the sensor 6, and stores the detection value in the response profile storage unit 113 in time series. In operation S03, the control unit 112 checks whether the supply of the driving electric power based on the command profile is completed over the entire period of the command profile.

If it is determined in operation S03 that there remains a period in which the supply of the driving electric power based on the command profile is not completed, the control device 100 returns the processing to operation S01. Thereafter, the control device 100 repeats the supply of the driving electric power based on the command profile to the motor 3 and the acquisition of the detection value of the state of the driven object 4 by the sensor 6 in a predetermined control cycle until the supply of the driving electric power is completed over the entire period of the command profile. If it is determined in operation S03 that the supply of the driving electric power based on the command profile has been completed over the entire period of the command profile, the acquisition of the response profile is completed.

Procedure of Generating Control Parameters

Figure 4:
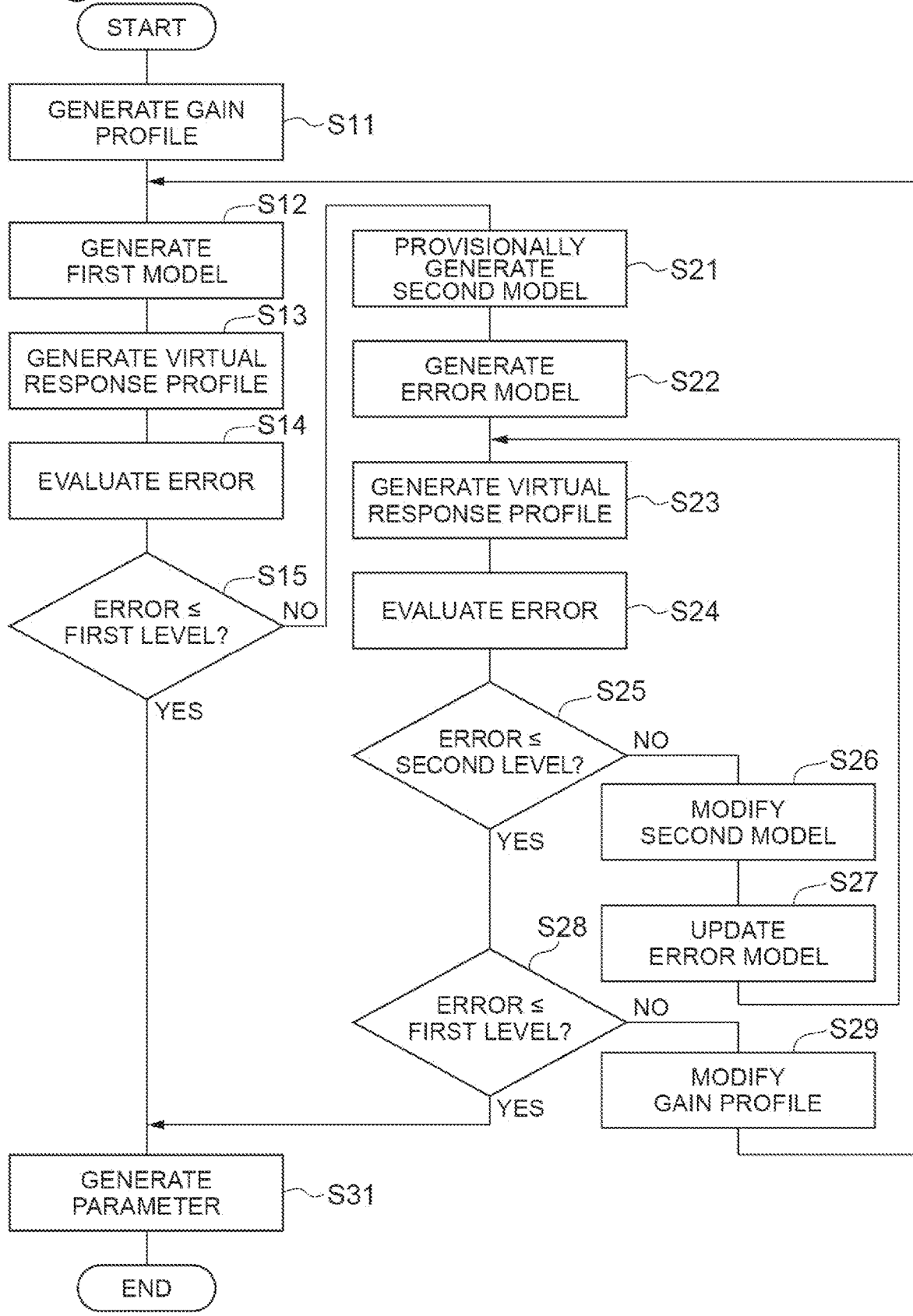
FIG. 4 is a flowchart illustrating an example parameter generation procedure.

As illustrated in FIG. 4, the control device 100 first executes operations S11, S12, S13, S14, and S15. In operation S11, the first model generation unit 114 generates a gain profile representing the relationship between the frequency of the command and the response gain of the controlled object 2 with respect to the command based on the command profile and the response profile, and stores the gain profile in the gain profile storage unit 115. In operation S12, the first model generation unit 114 generates the first model based on the linear model having frequency characteristics fitted to a gain profile.

In operation S13, based on the command profile stored in the command profile storage unit 111 and the first model and the second model stored in the model storage unit 121, the model evaluation unit 122 generates a virtual response profile obtained by simulating a temporal change in the state of the controlled object 2 corresponding to the command profile, and stores the virtual response profile in the virtual profile storage unit 123. Before the second model generation unit 132 generates the initial second model, the first model is stored in the model storage unit 121. The model evaluation unit 122 may generate a virtual response profile based on the command profile and the first model.

In operation S14, based on the response profile stored in the response profile storage unit 113 and the virtual response profile stored in the virtual profile storage unit 123, the model evaluation unit 122 evaluates an error of the virtual response profile with respect to the response profile. In operation S15, the second model generation unit 132 checks whether the evaluation result of the error in operation S14 is equal to or lower than the first level.

If it is determined in operation S15 that the evaluation result of error is not less than or equal to the first level, the control device 100 performs operations S21, S22, S23, S24, and S25. In operation S21, the second model generation unit 132 provisionally generates the second model based on the weighted sum of a plurality of types of elemental models, and stores the second model in the model storage unit 121.

In operation S22, the second model generation unit 132 generates an error model based on the provisionally generated second model and an evaluation result of an error based on the provisionally generated second model. For example, the second model generation unit 132 stores, in the learning data storage unit 133, a record in which the provisionally generated second model is associated with the evaluation result of the error based on the provisionally generated second model. Thereafter, the second model generation unit 132 generates an initial error model based on the record stored in the learning data storage unit 133 and stores the generated initial error model in the error model storage unit 134.

In operation S23, based on the command profile stored in the command profile storage unit 111 and the first model and the second model stored by the model storage unit 121, the model evaluation unit 122 generates a virtual response profile obtained by simulating a temporal change in the state of the controlled object 2 corresponding to the command profile, and stores the virtual response profile in the virtual profile storage unit 123.

In operation S24, based on the response profile stored in the response profile storage unit 113 and the virtual response profile stored in the virtual profile storage unit 123, the model evaluation unit 122 evaluates an error of the virtual response profile with respect to the response profile. In operation S25, the second model generation unit 132 checks whether the evaluation result of the error in operation S24 is equal to or lower than the second level.

If it is determined in operation S25 that the evaluation result of error is not equal to or lower than the second level, the control device 100 executes operations S26 and S27. In operation S26, the second model generation unit 132 modifies the weight based on a target error at the second level or lower and the error model, and stores the second model after the weight modification in the model storage unit 121.

In operation S27, the second model generation unit 132 updates the error model based on the second model after the weight is modified and the evaluation result of the error based on the second model after the weight is modified. For example, the second model generation unit 132 accumulates a record in which the second model after the modification of the weight is associated with the evaluation result of the error based on the second model after the modification of the weight in the learning data storage unit 133. Thereafter, the second model generation unit 132 updates the error model in the error model storage unit 134 based on the records accumulated in the learning data storage unit 133. The control device 100 then returns the processing to operation S23. Thereafter, until the evaluation result of the error becomes equal to or lower than the second level, the modification of the second model based on the error model and the update of the error model based on the modified second model are repeated.

If it is determined in operation S25 that the evaluation result of error is less than or equal to the second level, the control device 100 performs operation S28. In operation S28, the first model generation unit 114 checks whether the evaluation result of the error in operation S24 is equal to or lower than the first level.

If it is determined in operation S28 that the evaluation result of error is not less than or equal to the first level, the control device 100 performs operation S29. In operation S29, the first model generation unit 114 modifies the gain profile based on the command profile, the response profile, and the second model. The control device 100 then returns the processing to operation S02. Thus, the first model is regenerated based on the modified gain profile.

If it is determined in operation S15 that the evaluation result of error is equal to or lower than the first level, and if it is determined in operation S28 that the evaluation result of error is equal to or lower than the first level, the control device 100 executes operation S31. In operation S31, the parameter generation unit 141 generates the control parameters based on the first model and the second model stored in the model storage unit 121, and stores the control parameters in the parameter storage unit 142. Thus, the control parameters generation procedure is completed.

Control Procedure

Figure 5:
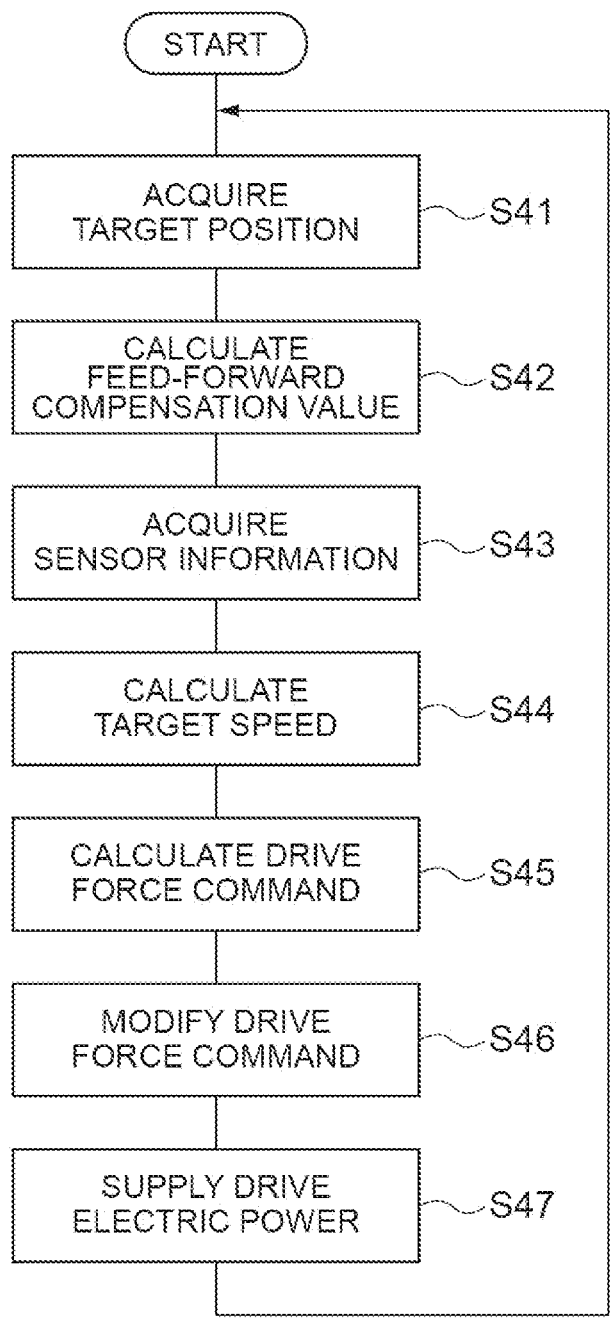
FIG. 5 is a flowchart illustrating an example control procedure of the motor based on a control parameter.

Next, a control procedure based on the control parameters will be described. As illustrated in FIG. 5, the control device 100 executes operations S41, S42, S43, S44, S45, S46, and S47 in order. In operation S41, the control unit 112 acquires a target position. For example, the control unit 112 may acquire the target position based on a target motion pattern of the driven object 4 given in advance, or may acquire the target position from a host controller. In operation S42, the control unit 112 calculates the feed-forward compensation value based on the target position and the control parameters stored in the parameter storage unit 142.

In operation S43, the control unit 112 acquires information of current position and current speed of the driven object 4 based on the detection value of the sensor 6. In operation S44, the control unit 112 calculates the target speed based on the error between the target position and the current position. In operation S45, the control unit 112 calculates a driving force command based on the error between the target speed and the current speed.

In operation S46, the control unit 112 adds the feed-forward compensation value to the driving force command to calculate a corrected command. In operation S47, the control unit 112 generates driving electric power based on the corrected command and supplies the driving electric power to the motor 3. The control unit 112 repeats the above procedure at a predetermined control cycle.

APPLICATION EXAMPLE

The above-described configuration is also applicable to a controlled object in which a plurality of motors are provided and a driven object includes a plurality of rigid bodies. For example, the above-described configuration is also applicable to an articulated robot illustrated in FIG. 6.

Figure 6:
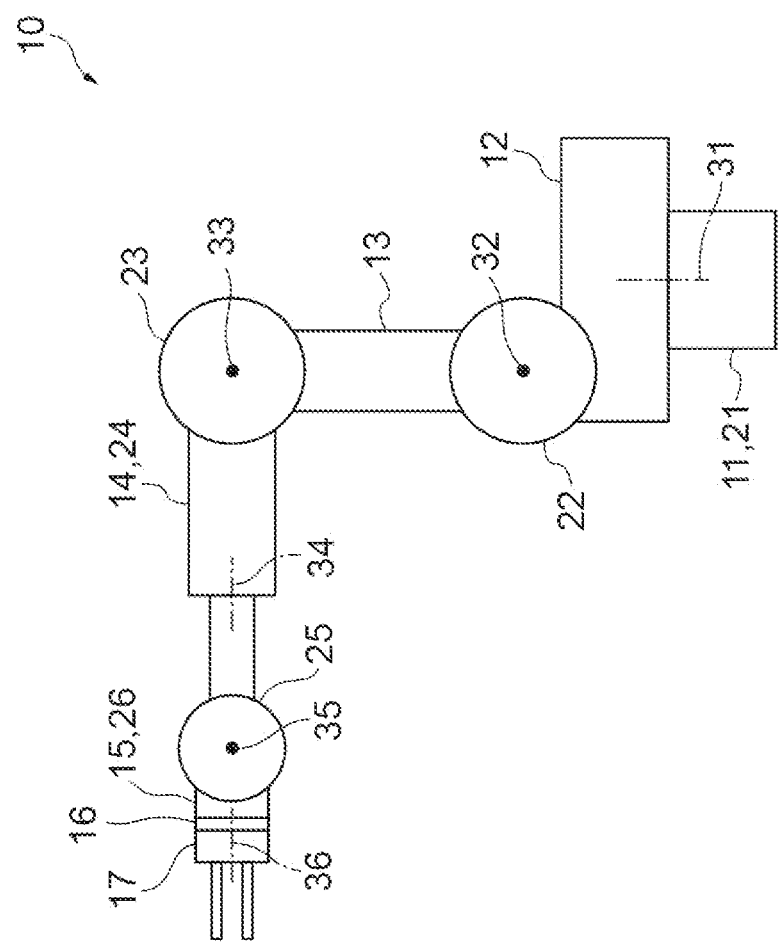
FIG. 6 is a schematic diagram illustrating an example schematic configuration of a robot.

A robot 10 illustrated in FIG. 6 is a so-called six axis vertical articulated robot, and includes a base 11, a pivoting portion 12, arms 13, 14, and 15, and a tool holding portion 16. The base 11 is fixed on a floor, a table, or an automated guided vehicle (AGV) in a work area. The pivoting portion 12 is mounted on the base 11 to pivot about a vertical an axis 31.

The arm 13 is connected to the pivoting portion 12 to swing about an axis 32 that intersects (for example, is orthogonal to) the axis 31. Here, the intersection includes a case in which there is a twisted relationship such as a so-called three-dimensional crossing. The arm 14 is connected to the distal end of the arm 13 so as to swing about an axis 33 parallel to the axis 32. The arm 15 is connected to the distal end of the arm 14 to pivot about an axis 34 that is along the arm 14 and intersects the axis 33, and to swing about an axis 35 that intersects (for example, is orthogonal to) the axis 34.

The tool holding portion 16 is connected to the distal end of the arm 15 so as to pivot about an axis 36 along the center of the arm 15. The tool holding portion 16 holds various tools 17 such as a hand for gripping workpieces, a welding torch, a paint gun, or a screwing tool.

A motor 21 turns the pivoting portion 12 about the axis 31. A motor 22 swings the arm 13 about the axis 32. A motor 23 swings the arm 14 about the axis 33. A motor 24 turns the distal end of the arm 14 about the axis 34. A motor 25 swings the arm 15 about the axis 35. A motor 26 turns the tool holding portion 16 about the axis 36.

In the robot 10, the tool holding portion 16 and the tool 17 are driven objects of the motor 26. The arm 15, the tool holding portion 16, and the tool 17 are driven objects of the motor 25. The distal end of the arm 14, the arm 15, the tool holding portion 16, and the tool 17 are driven objects of the motor 24. The arms 14 and 15, the tool holding portion 16, and the tool 17 are driven objects of the motor 23. The arms 13, 14, and 15, the tool holding portion 16, and the tool 17 are driven objects of the motor 22. The pivoting portion 12, the arms 13, 14, and 15, the tool holding portion 16, and the tool 17 are driven objects of the motor 21.

If the controlled object has a plurality of motors as in the robot 10, the control device 100 may perform the above-described procedure of generating the control parameters and the procedure of controlling the motor based on the control parameters for each motor.

As explained above, the control device 100 includes: the first model generation unit 114 configured to generate, based on the command profile representing a temporal change of the command for the controlled object 2 and the response profile representing a temporal change of a state of the controlled object 2 corresponding to the command profile, the first model representing at least a part of response characteristics of the controlled object 2 with respect to the command; the second model generation unit 132 configured to generate, based on the command profile, the response profile, and the first model, the second model representing characteristics that are not included in the first model among response characteristics; and the parameter generation unit 141 configured to generate, based on the first model and the second model, one or more control parameters that defines a relationship between the control reference and the control command for causing the controlled object 2 to follow the command.

After the first model representing characteristics of the controlled object 2 is generated, the second model representing characteristics not included in the first model is further generated based on the first model, and simulation is executed based on the first model and the second model. By using two types of models, the controlled object 2 may be modeled more accurately and an accuracy of the simulation may be improved.

The second model generation unit 132 may generate the second model based on a plurality of types of elemental models prepared in advance. Characteristics that are difficult to be modeled by the first model (for example, non-linear characteristics) can be readily modeled.

Each of the plurality of types of elemental models may be a model representing nonlinear characteristics with respect to the command. The nonlinear characteristics that cannot be modeled by a linear model can be readily modeled.

The control device 100 may further include the model evaluation unit 122 configured to generate the virtual response profile obtained by simulating, based on the command profile, the first model, and the second model, a temporal change of a state of the controlled object 2 corresponding to the command profile and evaluate an error of the virtual response profile with respect to the response profile. The second model generation unit 132 may be configured to: provisionally generate the second model based on a weighted sum of the plurality of types of elemental models; and generate the second model by repeating modifying the weights of the plurality of types of elemental models in the second model based on an evaluation result of an error based on the second model until a predetermined condition is satisfied. Characteristics that are difficult to model by first model may be modeled more readily.

The second model generation unit 132 may be configured to: generate, based on the second model that is provisionally generated and an evaluation result of the error based on the second model that is provisionally generated, an error model representing the relationship between the weights of a plurality of types of elemental models in the second model and the evaluation result of the error; and generate the second model by repeating modifying the weight based on a predetermined target error and the error model and updating the error model based on the second model after modifying the weight and the evaluation result of the error based on the second model after modifying the weight until the predetermined condition is satisfied. Characteristics that are difficult to be modeled by the first model can be modeled more quickly.

The first model generation unit 114 may generate a gain profile representing a relationship between a frequency of the command and a response gain of the controlled object 2 with respect to the command based on the command profile and the response profile and may generate the first model based on a linear model having frequency characteristics fitted to the gain profile. Since the linear model can be fitted by frequency analysis, readily and accurate modeling can be performed.

The first model generation unit 114 may regenerate the first model based on the command profile, the response profile, and the second model if the evaluation result of an error after the second model is generated exceeds a predetermined level. It is expected that accuracy of the first model is further improved by regenerating the first model in consideration of the second model after the second model is generated.

The first model generation unit 114 may modify the gain profile based on the command profile, the response profile, and the second model if the evaluation result of the error after the second model is generated exceeds a predetermined level and regenerate the first model by fitting the frequency characteristics of the linear model to the modified gain profile. By modifying the gain profile based on the second model, the first model may be regenerated readily and accurately in the same manner as the initial generation.

The first model generation unit 114 may generate a modified profile obtained by removing a response of the second model from the response profile based on the command profile, the response profile, and the second model, and may modify the gain profile based on the command profile and the modified profile if an evaluation result of an error after the second model is generated exceeds a predetermined level. The gain profile can readily be modified.

The second model generation unit 132 may regenerate the second model based on the command profile, the response profile, and the first model if the evaluation result of the error after the first model is regenerated exceeds a predetermined level. It is expected that the accuracy of the second model is further improved by regenerating the first model and then regenerating the second model in consideration of the first model.

The control device 100 may further include the model evaluation unit 122 configured to generate the virtual response profile obtained by simulating, based on the command profile, the first model, and the second model, a temporal change of a state of the controlled object 2 according to the command profile, and evaluate an error of the virtual response profile with respect to the response profile. The second model generation unit 132 may be configured to: provisionally generate the second model; and generate the second model by repeating modifying the second model based on the evaluation result of the error based on the second model until a predetermined condition is satisfied. The first model generation unit 114 may be configured to regenerate the first model based on the command profile, the response profile, and the second model if the evaluation result of the error after the second model is generated exceeds a predetermined first level.

The second model generation unit 132 may be configured to generate the second model by repeating modifying the second model based on the evaluation result of the error based on the second model until the evaluation result of the error becomes equal to or lower than a second level higher than the first level.

The second model generation unit 132 may regenerate the second model based on the command profile, the response profile, and the first model if the evaluation result of the error after the first model is regenerated exceeds a first level.

The controlled object 2 may include the driven object 4 and the motor 3 driving the driven object 4. The command may be a command of driving force generated in the motor 3. The state of the controlled object 2 may be the speed of the driven object 4.

The controlled object 2 may have the driven object 4 and the motor 3 driving the driven object 4, the command may be a command of a driving force generated in the motor 3, and the state of the controlled object 2 may be a position of the driven object 4.

The temporal change of the command in the command profile may include oscillation of the command.

It is to be understood that not all aspects, advantages and features described herein may necessarily be achieved by, or included in, any one particular example. Indeed, having described and illustrated various examples herein, it should be apparent that other examples may be modified in arrangement and detail.

What is claimed is:

1. A control system comprising circuitry configured to:
generate, based on a command profile representing a temporal change of a command for driving a controlled object and a response profile representing a temporal change of a state of the controlled object responding to the command profile, a first model representing at least a part of a relation between the command and the state of the controlled object;
generate, based on the command profile, the response profile, and the first model, a second model representing another part of the relation that is not represented by the first model;
generate, based on the first model and the second model, one or more control parameters representing a relation between a control reference and the command for causing the controlled object to follow the control reference; and
control the controlled object to cause the state of the controlled object to follow the control reference based at least in part on the control reference and the one or more control parameters.

2. The control system according to claim 1, wherein the circuitry is configured to generate the second model based on a combination of a plurality of types of predetermined elemental models.

3. The control system according to claim 2, wherein each of the predetermined elemental models is a model representing a nonlinear relation between the command profile and the response profile.

4. The control system according to claim 2, wherein the circuitry is further configured to:
generate a weighted sum of the predetermined elemental models as the second model;
generate a virtual response profile obtained by simulating, based on the command profile, the first model, and the second model, the temporal change of the state of the controlled object; and
modify weights of the predetermined elemental models in the second model to reduce a difference between the virtual response profile and the response profile.

5. The control system according to claim 4, wherein the circuitry is configured to:
generate, based on the weights and the difference, a difference model representing a relationship between the weights and the difference; and
generate the second model by repeating:
modifying the weights to reduce the difference; and
updating the difference model based on the weighted sum according to the modified weights and the difference calculated after modifying the weights.

6. The control system according to claim 4, wherein the circuitry is configured to:
calculate a gain-frequency characteristic of the state of the controlled object to the command based on the command profile and the response profile; and
generate the first model to have the calculated gain-frequency characteristic.

7. The control system according to claim 6, wherein the circuitry is configured to regenerate the first model based on the command profile, the response profile, and the second model in response to determining that the difference exceeds a predetermined level.

8. The control system according to claim 7, wherein the circuitry is configured to:
modify the gain-frequency characteristic based on the command profile, the response profile, and the second model; and
regenerate the first model to have the modified gain-frequency characteristic.

9. The control system according to claim 8, wherein the circuitry is configured to:
calculate a response of the second model to the command profile;
modify the response profile by removing the calculated response of the second model to the command profile; and
modify the gain-frequency characteristic based on the command profile and the modified response profile.

10. The control system according to claim 7, wherein the circuitry is configured to regenerate the second model based on the command profile, the response profile, and the regenerated first model in response to determining that the difference calculated after the first model is regenerated exceeds the predetermined level.

11. The control system according to claim 1, wherein the circuitry is further configured to:

generate a virtual response profile obtained by simulating, based on the command profile, the first model, and the second model, the temporal change of the state of the controlled object;

modify the second model to reduce a difference between the virtual response profile and the response profile; and regenerate the first model based on the command profile, the response profile, and the modified second model, in response to determining that the difference calculated after the second model is modified exceeds a predetermined level.

12. The control system according to claim 11, wherein the circuitry is configured to generate the second model by repeating to modify the second model to make the difference lower than a predetermined second level higher than the predetermined level.

13. The control system according to claim 11, wherein the circuitry is configured to regenerate the second model based on the command profile, the response profile, and the regenerated first model in response to determining that the difference calculated after the first model is regenerated exceeds the predetermined level.

14. The control system according to claim 1, wherein the controlled object comprises a driven object and a motor that drives the driven object, wherein the command includes a designation of a driving force to be generated by the motor for driving the driven object, wherein the state of the controlled object includes a state of the driven object that varies according to the driving force, and wherein the control reference includes a designation of a target state of the driven object.

15. The control system according to claim 14, wherein the state of the driven object includes a speed of the driven object, and wherein the control reference includes a designation of a target speed of the driven object.

16. The control system according to claim 14, wherein the state of the controlled object includes a position of the driven object, and wherein the control reference includes a designation of a target position of the driven object.

17. The control system according to claim 1, wherein the temporal change of the command in the command profile includes an oscillation of the command.

18. The control system according to claim 1, wherein the circuitry is configured to:

generate a first command for causing the state of the controlled object to follow the control reference based on a difference between the control reference and the state of the controlled object;

generate a second command for causing the state of the controlled object to follow the control reference based on the control reference and the one or more control parameters; and modify the first command based on the second command to generate the modified first command as the command for causing the state of the controlled object.

19. A method comprising:

generating, based on a command profile representing a temporal change of a command for a controlled object and a response profile representing a temporal change of a state of the controlled object responding to the command profile, a first model representing at least a part of a relation between the command and the state of the controlled object;

generating, based on the command profile, the response profile, and the first model, a second model representing another part of the relation that is not represented by the first model;

generating, based on the first model and the second model, one or more control parameters representing a relation between a control reference and the command for causing the controlled object to follow the control reference; and transmitting the one or more control parameters for controlling the controlled object to cause the state of the controlled object to follow the control reference based at least in part on the control reference and the one or more control parameters.

20. A non-transitory memory device having instructions stored thereon that, in response to execution by a processing device, cause the processing device to perform operations comprising:

generating, based on a command profile representing a temporal change of a command for a controlled object and a response profile representing a temporal change of a state of the controlled object responding to the command profile, a first model representing at least a part of a relation between the command and the state of the controlled object;

generating, based on the command profile, the response profile, and the first model, a second model representing another part of the relation that is not represented by the first model;

generating, based on the first model and the second model, one or more control parameters representing a relation between a control reference and the command for causing the controlled object to follow the control reference; and transmitting the one or more control parameters for controlling the controlled object to cause the state of the controlled object to follow the control reference based at least in part on the control reference and the one or more control parameters.

* * * * *